(12) United States Patent
Spamer et al.

(10) Patent No.: US 10,220,682 B2
(45) Date of Patent: Mar. 5, 2019

(54) VENT ASSEMBLIES

(75) Inventors: Carl David Spamer, Brighton, MI (US); Daniel Frank Gillay, Plymouth, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 2990 days.

(21) Appl. No.: 12/582,773

(22) Filed: Oct. 21, 2009

(65) Prior Publication Data

US 2011/0092149 A1  Apr. 21, 2011

(51) Int. Cl.
*B60H 1/34* (2006.01)

(52) U.S. Cl.
CPC ... *B60H 1/3428* (2013.01); *B60H 2001/3492* (2013.01)

(58) Field of Classification Search
CPC ........................................................ B60H 1/34
USPC .................................................... 454/69, 155
See application file for complete search history.

(56) References Cited

U.S. PATENT DOCUMENTS

| | | | | |
|---|---|---|---|---|
| 1,346,383 A | * | 7/1920 | Raab et al. | 454/149 |
| 3,190,662 A | * | 6/1965 | Mayfield | 277/478 |
| 3,244,194 A | * | 4/1966 | Henry | 137/460 |
| 3,561,167 A | * | 2/1971 | Borganti | 51/324 |
| 4,793,206 A | * | 12/1988 | Suzuki | 74/501.5 R |
| 4,877,264 A | * | 10/1989 | Cuevas | 280/731 |
| 5,072,967 A | | 12/1991 | Batchelder et al. | |
| RE33,938 E | * | 5/1992 | Cuevas | 280/731 |
| 5,127,874 A | * | 7/1992 | Wiles | 454/7 |
| 5,343,592 A | * | 9/1994 | Parise | 15/353 |
| 5,522,766 A | * | 6/1996 | Peterson | 454/69 |
| 6,036,593 A | * | 3/2000 | Koerber et al. | 454/69 |
| 6,168,188 B1 | | 1/2001 | Preisler et al. | |
| 6,203,056 B1 | | 3/2001 | Labrie et al. | |
| 6,227,419 B1 | * | 5/2001 | Raboin | 222/484 |
| 6,431,585 B1 | | 8/2002 | Rickabus et al. | |
| 7,156,415 B2 | | 1/2007 | Gray et al. | |
| 7,370,488 B2 | * | 5/2008 | Kidwell et al. | 62/260 |
| 7,377,122 B2 | * | 5/2008 | Kidwell et al. | 62/260 |
| 7,458,604 B2 | | 12/2008 | Hier et al. | |
| 7,530,596 B2 | | 5/2009 | Bito | |
| 7,566,261 B2 | * | 7/2009 | Ono et al. | 454/155 |
| 2002/0072702 A1 | * | 6/2002 | Quay | 604/74 |
| 2005/0236822 A1 | | 10/2005 | Rose et al. | |
| 2006/0098975 A1 | * | 5/2006 | Kobayashi | 396/448 |
| 2006/0220356 A1 | | 10/2006 | Baekelandt | |
| 2007/0066206 A1 | * | 3/2007 | Ono et al. | 454/69 |
| 2007/0228703 A1 | * | 10/2007 | Breed | 280/735 |
| 2008/0197609 A1 | | 8/2008 | Jaramillo et al. | |

\* cited by examiner

*Primary Examiner* — Steven B McAllister
*Assistant Examiner* — Samantha Probst
(74) *Attorney, Agent, or Firm* — Dinsmore & Shohl LLP

(57) ABSTRACT

Disclosed is a vent assembly that includes a fin/actuator sub-assembly that includes an aperture, an inner ring that includes a plurality of protrusions, each protrusion including a retention surface, and an annular retaining member, wherein when the annular retaining member is in a retaining engagement with the fin/actuator sub-assembly and the inner ring, a portion of the annular retaining member is disposed within the aperture of the fin/actuator sub-assembly, and portions of the annular retaining member contact the retention surfaces of the protrusions of the inner ring.

20 Claims, 4 Drawing Sheets

VENT ASSEMBLIES

TECHNICAL FIELD

The invention relates to vent assemblies, and more particularly, to vent assemblies that retain components during airbag deployment.

BACKGROUND

During airbag deployment, components may become detached from vent assemblies. Accordingly, vent assemblies that retain detached components during airbag deployment are of continued interest.

SUMMARY

One embodiment of a vent assembly includes a fin/actuator sub-assembly that includes an aperture, an inner ring that includes a plurality of protrusions, each protrusion including a retention surface, and an annular retaining member, wherein when the annular retaining member is in a retaining engagement with the fin/actuator sub-assembly and the inner ring, a portion of the annular retaining member is disposed within the aperture of the fin/actuator sub-assembly, and portions of the annular retaining member contact the retention surfaces of the protrusions of the inner ring.

Another embodiment of a vent assembly includes a fin/actuator sub-assembly that includes at least one fin and an actuator, the actuator including an aperture, an inner ring that includes a plurality of tabs, each tab including a retention surface, and an O-ring, wherein when the O-ring is in a retaining engagement with the inner ring and the fin/actuator sub-assembly, a portion of the O-ring is disposed within the aperture of the actuator, and portions of the O-ring contact the retention surfaces of the tabs of the inner ring.

Another embodiment of a vent assembly includes a fin/actuator sub-assembly that includes an aperture, an inner ring that includes a plurality of tabs, each tab including a retention surface, a flexible O-ring, an outer ring, and a back ring, wherein when the O-ring is in a retaining engagement with the inner ring and the fin/actuator sub-assembly, a portion of the O-ring is disposed within the aperture of the fin/actuator sub-assembly, and portions of the O-ring contact the retention surfaces of the tabs of the inner ring.

These and additional features can be more fully understood in view of the following detailed description, in conjunction with the drawings.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
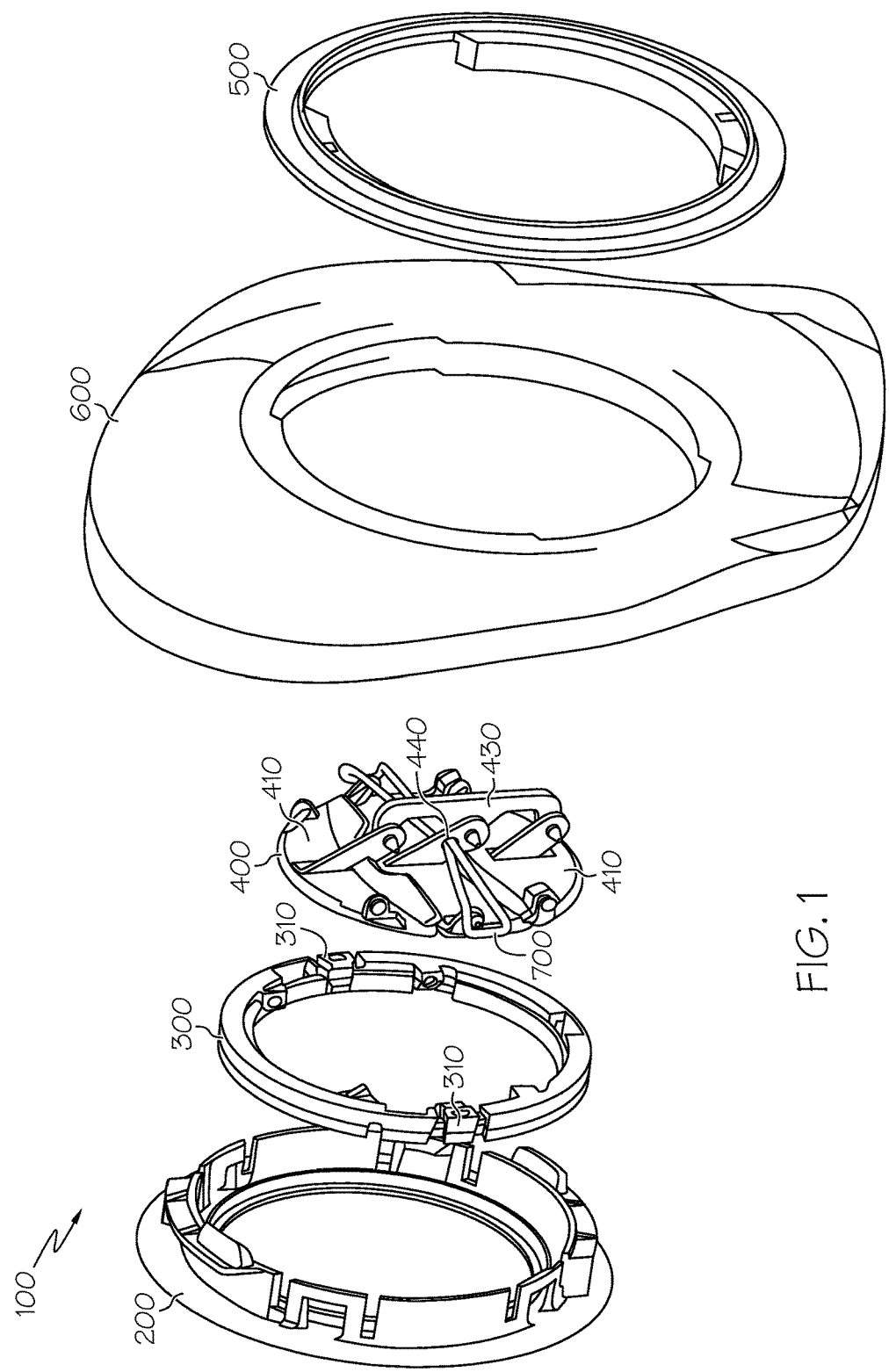
FIG. 1 is an exploded view of an embodiment of a vent assembly.

Referring to FIG. 1, embodiments of a vent assembly 100 may include a fin/actuator sub-assembly 400, an inner ring 300 and an annular retaining member 700. Embodiments of vent assembly 100 may also include an outer ring 200 and a back ring 500. A portion of a headliner 600 may be disposed between the assembled components of embodiments of vent assembly 100.

Figure 2:
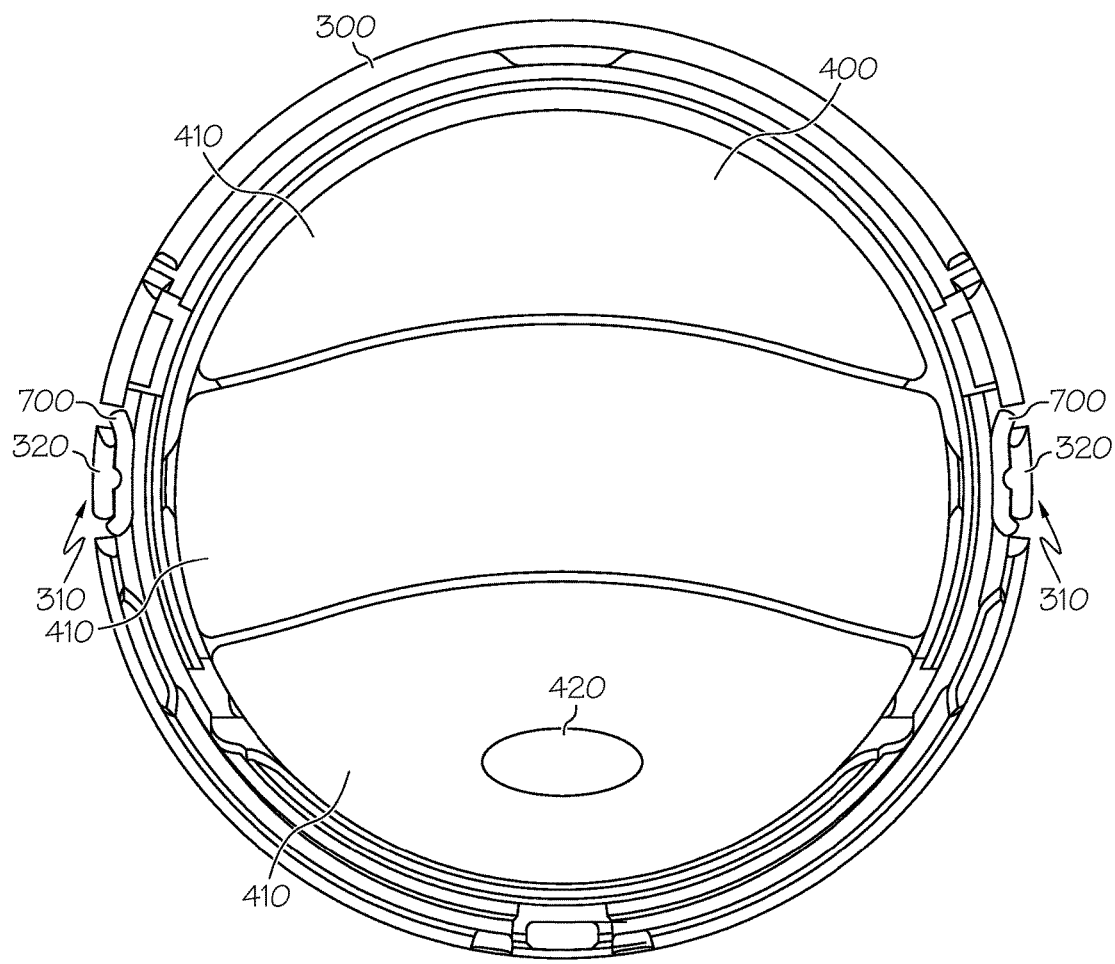
FIG. 2 is a front view of an embodiment of a vent assembly.
Figure 3:
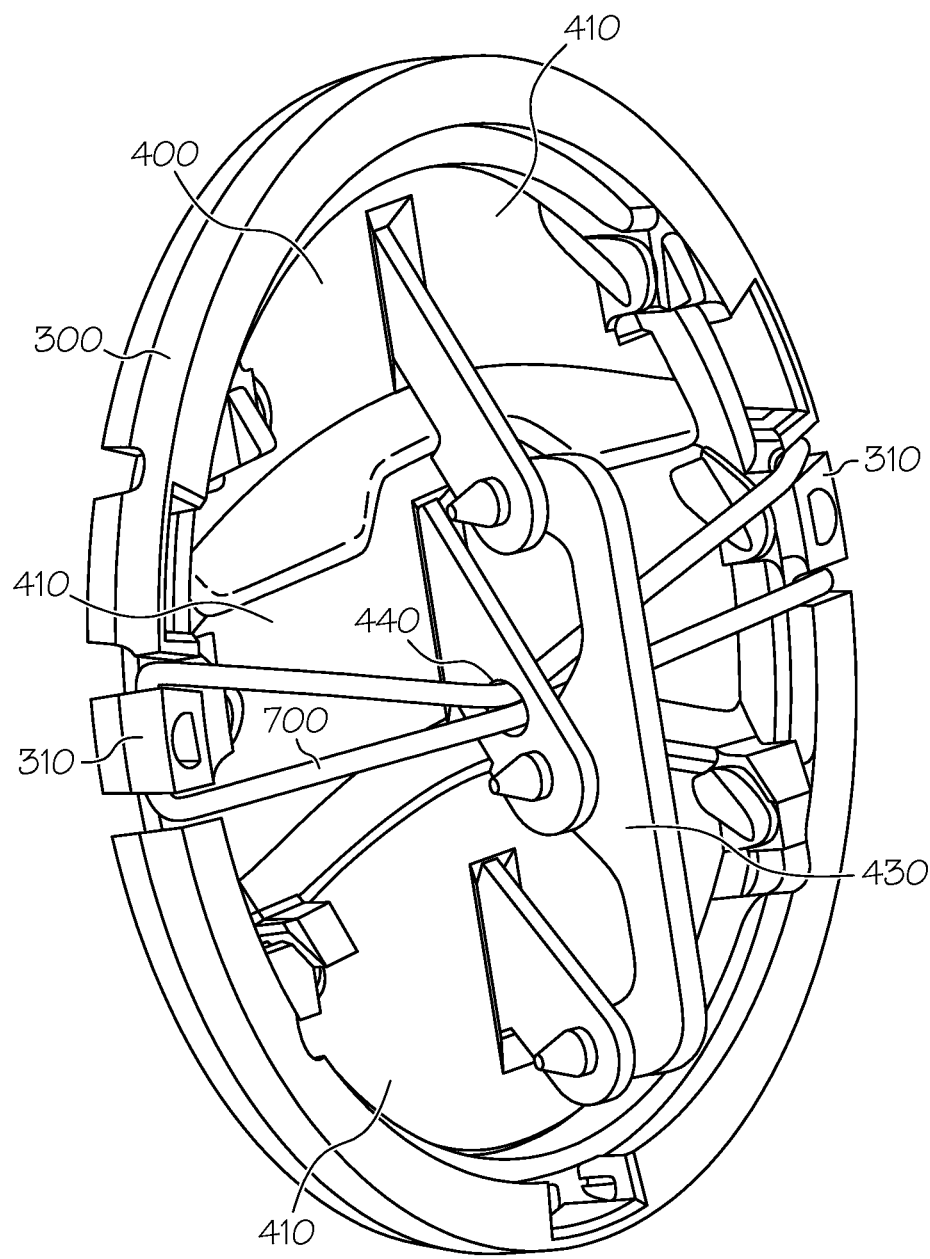
FIG. 3 is a rear perspective view of the vent assembly of FIG. 2.

Fin/actuator sub-assembly 400 may be circular in shape and may include a plurality of fins 410 and an actuator 430. The illustrated embodiments of vent assembly 100 include a fin/actuator sub-assembly 400 that has three fins 410 connected by actuator 430. Fins 410 function to direct air flowing through the vent assembly, and actuator 430 functions to ensure that the plurality of fins are synced in movement. Accordingly, referring to FIG. 2, when a user presses on a designated contact area 420 on the front surface of the fins, or any other portion of the front surface of the fins, the plurality of fins operate in sync. Referring to FIG. 3, fin/actuator sub-assembly 400 may further include an aperture 440 for the retention of annular retaining member 700. The aperture may be disposed at any location on fin/actuator sub-assembly 400. The illustrated embodiments of fin/actuator sub-assembly 400 include aperture 440 that is a hole formed on the portion of actuator 430 that is connected to the middle fin. However, aperture 440 may be a hole formed on any other portion of fin/actuator sub-assembly 400, including other portions of actuator 440 and any part of fins 410. Moreover, aperture 440 need not be a hole formed on the fin/actuator sub-assembly, and thus may comprise any void on the fin/actuator sub-assembly (e.g., the space between actuator fins 410 and actuator 430), or formed by any additional structure disposed on the fin/actuator sub-assembly, such as loop structure formed on actuator 430 and/or fins 410.

Inner ring 300 may be annular-shaped to correspond to the shape of fin/actuator sub-assembly 400 and may include a plurality of protrusions 310 (i.e., tabs). The illustrated embodiments of vent assembly 100 include an inner ring 300 that has two protrusions 310 that are tabs formed through the inclusion of grooves on the outside perimeter of the inner ring. However, any number, size, shape and/or style of protrusions may be included on inner ring 300. Referring to FIG. 2, protrusions 310 each include a retention surface 320 that functions to contact and retain a portion of annular retaining member 700. In some embodiments, retention surface 320 may further include a groove or protrusion to further assist in the retention of annular retaining member 700.

Annular retaining member 700 may function to retain fin/actuator sub-assembly 400 to inner ring 300 during airbag deployment (as further detailed below). Annular retaining member 700 may be formed from any flexible, elastic or inelastic material known in the art, including, but not limited to, natural and synthetic rubbers, plastics, polymers and fibers. The cross-section of annular retaining member 700 may be any shape and/or size, including, but not limited to, flat, round and square. The illustrated embodiments of vent assembly 100 include annular retaining member 700 that is a flexible O-ring that is round in cross-section. However, other types of annular retaining members may be utilized, including various other types of O-rings and bands.

Outer ring 200 may be annular-shaped to correspond to the shape of inner ring 300 and may also include structure (e.g., tabs, protrusions and recesses) to connect to back ring 500. Back ring 500 may also be annular-shaped to correspond to the shape of inner ring 300 and may include structure (corresponding to the structure of outer ring 200) to connect to outer ring 200. A stationary portion of the vehicle interior, such as headliner 600, may be disposed between outer ring 200 and back ring 500 when those two components are connected to one another. The connections/engagements of the above-detailed components in the construction of embodiments of vent assembly 100 are described below.

Embodiments of vent assembly 100 may be partially constructed by connecting fin/actuator sub-assembly 400 to inner ring 300. In the illustrated embodiments, fin/actuator sub-assembly 400 and inner ring 300 include corresponding structure to allow these two components to snap together in a locked engagement. Accordingly, when in a locked engagement, fin/actuator sub-assembly 400 is secured within inner ring 300 and not able to rotate within the inner ring. The connection between fin/actuator sub-assembly 400 and inner ring 300 may utilize any structure and/or method known in the art. FIGS. 2 and 3 illustrate an embodiment of fin/actuator sub-assembly 400 and inner ring 300 in a locked engagement.

Once fin/actuator sub-assembly 400 and inner ring 300 are connected in a locked engagement, annular retaining member 700 may be positioned in a retaining engagement with the fin/actuator sub-assembly and the inner ring. When annular retaining member 700 is in a retaining engagement with fin/actuator sub-assembly 400 and inner ring 300, a portion of the annular retaining member is disposed through aperture 440 of fin/actuator sub-assembly, and portions of the annular retaining member are in contact with retention surfaces 320 on protrusions 310 of the inner ring. In the illustrated embodiments, annular retaining member 700 is situated in a retaining engagement with fin/actuator sub-assembly 400 and inner ring 300 when a portion of the annular retaining member is put in contact with a first retaining surface (i.e., annular retaining member 700 is hooked over protrusion 310), a portion of the annular retaining member is disposed through aperture 440, and a portion of the annular retaining member is put in contact with a second retaining surface (i.e., annular retaining member 700 is hooked over the other protrusion 310).

Figure 4:
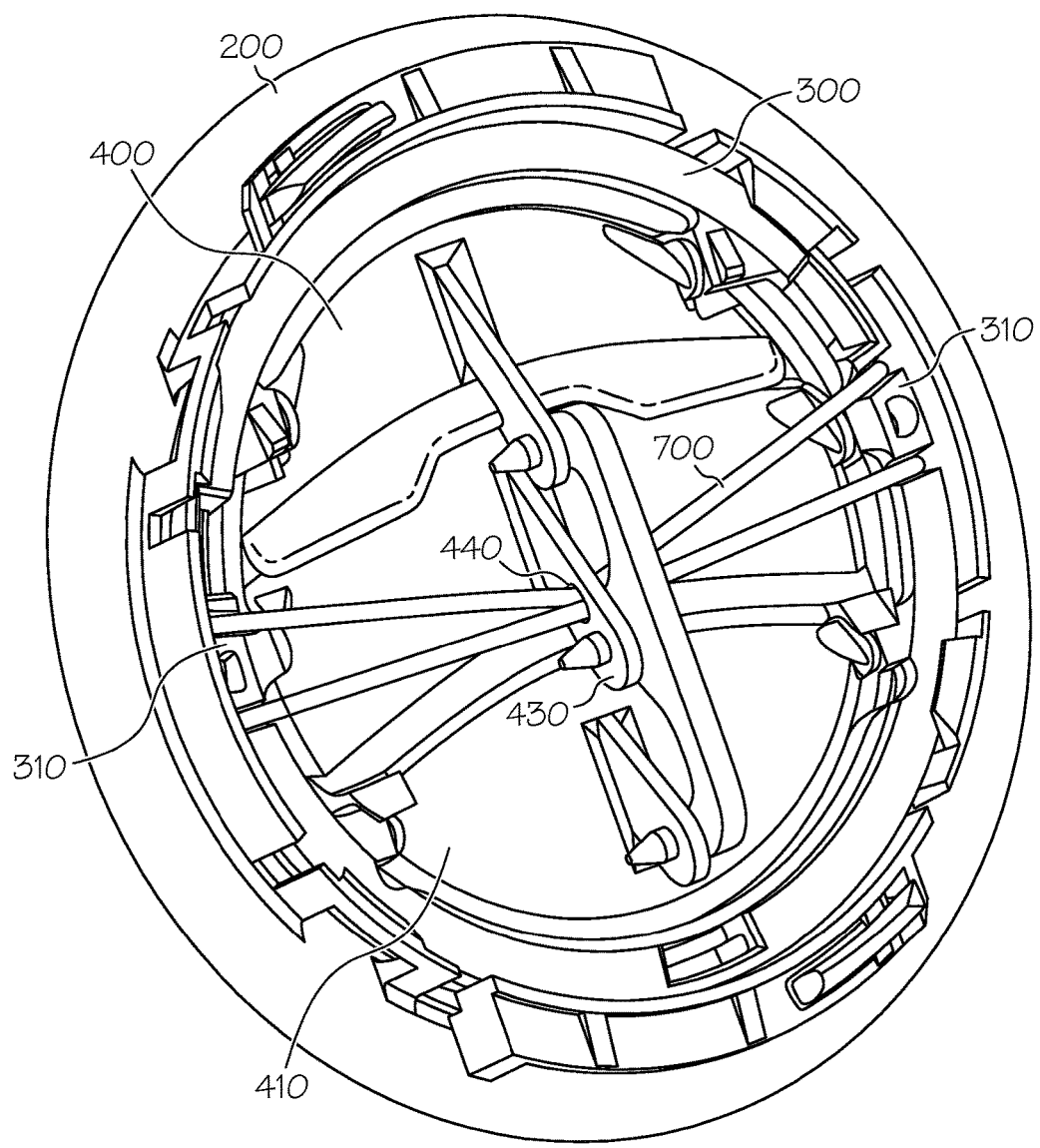
FIG. 4 is a rear perspective view of an embodiment of a vent assembly.

Embodiments of vent assembly 100 may be further constructed by connecting inner ring 300 to outer ring 200. In the illustrated embodiments, inner ring 300 and outer ring 200 include corresponding structure to allow these components to snap together in a rotating engagement. Accordingly, when in a rotating engagement, inner ring 300 is secured within outer ring 200 and able to rotate in either direction with respect to the outer ring. The connection between inner ring 300 and outer ring 200 may utilize any structure and/or method known in the art. FIG. 4 illustrates an embodiment of inner ring 300 and outer ring 200 in a rotating engagement. When inner ring 300 and outer ring 200 are snapped together in such a rotating engagement, the combined fin/actuator sub-assembly and inner ring (snapped together in a locked engagement) are secured within the outer ring and able to rotate freely 360 degrees in either direction with respect to the outer ring. Accordingly, a user may grab any part of fin/actuator sub-assembly 400 and/or inner ring 300 and rotate the combined sub-assembly and inner ring together within outer ring 200.

The terms "rotate freely" and/or "free rotation" are defined as continued rotation in any direction without an eventual stoppage of the rotation after a number of revolutions in a single direction. In lieu of annular retaining member 700 connecting fin/actuator sub-assembly 400 to inner ring 300, if a tether was utilized to attach the fin/actuator sub-assembly directly to a stationary component of the vent assembly (e.g., the outer ring), the vehicle interior (e.g., the headliner), or the sheet metal behind the interior, the sustained capability of the fin/actuator sub-assembly to rotate freely with respect to the outer ring would be inhibited and/or eliminated. This is because after a number of fin/actuator sub-assembly rotations in any one direction, the tether would become twisted to a degree that would not allow further rotation of the fin/actuator sub-assembly with respect to outer ring 200. However, embodiments of vent assembly 100 utilize annular retaining member 700 to connect fin/actuator sub-assembly 400 to inner ring 300, and thus, free rotation of the combined fin/actuator sub-assembly and inner ring may continue for any number of revolutions uninhibited. This is because annular retaining member 700 only connects fin/actuator sub-assembly 400 a component of vent assembly 100 that rotates with the fin/actuator sub-assembly (e.g., inner ring 300).

Vent assembly 100 may be further constructed by connecting outer ring 200 to back ring 500. In some embodiments, a portion of a headliner 600 may be disposed between the connection of outer ring 200 and back ring 500 to secure the vent assembly on a vehicle interior. Back ring 500 may also be affixed to headliner 600 to further secure vent assembly 100 in place on the vehicle interior. Back ring 500 may be affixed to headliner 600 through any method known in the art, including, but not limited to, glues, epoxies, rivets and staples. However, back ring 500 need not be affixed to headliner 600, as the disposition of a portion of the headliner between back ring 500 and outer ring 200 may be sufficient to hold vent assembly 100 in place on the vehicle interior. Outer ring 200 and back ring 500 may include corresponding structure to allow the components to connect in a locking engagement. The connection between outer ring 200 and back ring 500 may utilize any structure and/or method known in the art. When outer ring 200 and back ring 500 are connected in a locking engagement, the outer ring is not able to rotate with respect to the back ring. Due to the disposition of a portion of headliner 600 (or other stationary portion of the vehicle interior) between outer ring 200 and back ring 500, the outer ring is also not able to rotate with respect to the surrounding vehicle interior. Accordingly, outer ring 200 of vent assembly 100 remains locked in place on the vehicle interior due to the placement of a portion of headliner 600 between back ring 500 and the outer ring, but a user may grab any part of fin/actuator sub-assembly 400 and/or inner ring 300 and rotate the combined sub-assembly and inner ring with respect to the outer ring.

During airbag deployment, vent assemblies, or components of vent assemblies, may become detached from the interior of a vehicle. As an example, components of vent assemblies disposed on the headliner of a vehicle may become detached due to the force of deployment of a side-curtain airbag that is located adjacent or under the headliner. When the airbag deploys, it may contact a HVAC duct behind the vent assembly (or directly contact the assembly), compressing the duct and exerting a force on the assembly. With reference to the embodiments of vent assemblies 100 detailed above, the assemblies may be designed so that the force of an airbag deployment breaks the locked engagement of fin/actuator sub-assembly 400 and inner ring 300, thus detaching the fin/actuator sub-assembly from the remainder of vent assembly 100. Such a design strategy functions to ensure that the entire vent assembly does not detach from the vehicle interior.

When the locked engagement between fin/actuator sub-assembly 400 and inner ring 300 is broken during airbag deployment, annular retaining member 700 that is in retaining engagement with the fin/actuator sub-assembly and the inner ring may retain the fin/actuator sub-assembly to the inner ring. Accordingly, annular retaining member 700 ensures that fin/actuator sub-assembly 400 does not completely disconnect from inner ring 300 during airbag deployment. Moreover, because inner ring 300 remains in rotating engagement with outer ring 200 and the outer ring remains in locked engagement with back ring 500 and headliner 600 during airbag deployment, the inner ring remains secured to the vehicle interior. Therefore, fin/actuator sub-assembly 400, which is connected to inner ring 300 through employment of annular retaining member 700, also remains connected to the vehicle interior.

Moreover, in embodiments of vent assembly 100 that utilize a flexible and/or elastic annular retaining member 700, the annular retaining member may provide a multi-point shock absorber to assist in reducing the force exerted on inner ring 300 by detached fin/actuator sub-assembly during airbag deployment. In lieu of annular retaining member 700 connecting fin/actuator sub-assembly 400 to inner ring 300, if a non-elastic tether was utilized to attach the fin/actuator sub-assembly to the inner ring at a single point, the tether may transfer too great of a force from the detached fin/actuator sub-assembly to a single location on the inner ring during airbag deployment, thus breaking the rotating engagement between the inner ring and the outer ring and detaching the inner ring from the vent assembly. However, by utilizing annular retaining member 700 that engages a plurality of retention surfaces 320 on protrusions 310 of inner ring 300, the force of detached fin/actuator sub-assembly 400 may be distributed to multiple locations on the inner ring, allowing the inner ring to remain in rotating engagement with outer ring 200. Further, the elasticity of an elastic annular retaining member 700 may further act as a shock absorber to dissipate the force transferred from the detached fin/actuator sub-assembly to the inner ring.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A vent assembly comprising:
   a fin/actuator sub-assembly that includes an aperture;
   an inner ring that includes a plurality of protrusions, each protrusion including a retention surface; and
   an annular retaining member;
   wherein when the annular retaining member is in contact with and in a retaining engagement with the fin/actuator sub-assembly and in contact with and in a retaining engagement with the inner ring, a portion of the annular retaining member is disposed within the aperture of the fin/actuator sub-assembly, and portions of the annular retaining member contact the retention surfaces of the protrusions of the inner ring.

2. The vent assembly of claim 1, wherein the fin/actuator sub-assembly is in a locked engagement with the inner ring.

3. The vent assembly of claim 1, wherein the inner ring is in a rotating engagement with an outer ring that is secured to the vehicle interior.

4. The vent assembly of claim 3, wherein the annular retaining member does not inhibit free rotation of the inner ring with respect to the outer ring.

5. The vent assembly of claim 3, wherein the outer ring is secured to a headliner of the vehicle interior.

6. The vent assembly of claim 1, wherein the annular retaining member is not connected to sheet metal of the vehicle.

7. The vent assembly of claim 1, wherein the annular retaining member comprises an elastic material.

8. The vent assembly of claim 7, wherein the annular retaining member is a rubber O-ring.

9. A vent assembly comprising:
   a fin/actuator sub-assembly that comprises at least one fin and an actuator, the actuator comprising an aperture;
   an inner ring that comprises a plurality of tabs, each tab including a retention surface; and
   an O-ring;
   wherein when the O-ring is in contact with and in a retaining engagement with the inner ring and in contact with and in a retaining engagement with the fin/actuator sub-assembly, a portion of the O-ring is disposed within the aperture of the actuator, and portions of the O-ring contact the retention surfaces of the tabs of the inner ring.

10. The vent assembly of claim 9, wherein the fin/actuator sub-assembly is in a locked engagement with the inner ring.

11. The vent assembly of claim 9, wherein the inner ring is in a rotating engagement with an outer ring that is secured to the vehicle interior.

12. The vent assembly of claim 11, wherein the O-ring does not inhibit free rotation of the inner ring with respect to the outer ring.

13. The vent assembly of claim 11, wherein the outer ring is secured to a headliner of the vehicle interior.

14. The vent assembly of claim 9, wherein the O-ring is not connected to sheet metal of the vehicle.

15. The vent assembly of claim 9, wherein the O-ring is made of rubber.

16. A vent assembly comprising:
   a fin/actuator sub-assembly that includes an aperture;
   an inner ring that includes a plurality of tabs, each tab including a retention surface;
   a flexible O-ring;
   an outer ring; and
   a back ring;
   wherein when the O-ring is in contact with and in a retaining engagement with the inner ring and in contact with and in a retaining engagement with the fin/actuator sub-assembly, a portion of the O-ring is disposed within the aperture of the fin/actuator sub-assembly, and portions of the O-ring contact the retention surfaces of the tabs of the inner ring.

17. The vent assembly of claim 16, wherein the fin/actuator sub-assembly is in a locked engagement with the inner ring.

18. The vent assembly of claim 16, wherein the inner ring is in a rotating engagement with the outer ring that is secured to the vehicle interior.

19. The vent assembly of claim 18, wherein the O-ring does not inhibit free rotation of the inner ring with respect to the outer ring.

20. The vent assembly of claim 18, wherein the outer ring is secured to a headliner of the vehicle interior through a locking engagement between outer ring and back ring.

* * * * *